(12) United States Patent
Buffa et al.

(10) Patent No.: US 10,815,060 B2
(45) Date of Patent: Oct. 27, 2020

(54) BUFFER APPARATUS FOR CORES MADE OF PAPER MATERIAL, FOR PRODUCTION LINES OF TOILET ROLLS OR ABSORBENT PAPER ROLLS OR SIMILAR PAPER OR ABSORBENT MATERIALS

(71) Applicant: GAMBINI S.p.A., Milan (IT)

(72) Inventors: Giovanni Buffa, Ponte Buggianese (IT); Fabio Picchi, Lammari (IT)

(73) Assignee: GAMBINI S.p.A., Milan (IT)

( * ) Notice: Subject to any disclaimer, the term of this patent is extended or adjusted under 35 U.S.C. 154(b) by 126 days.

(21) Appl. No.: 15/970,030

(22) Filed: May 3, 2018

(65) Prior Publication Data

US 2018/0319591 A1  Nov. 8, 2018

(30) Foreign Application Priority Data

May 4, 2017  (IT) .......................... 102017000048038

(51) Int. Cl.
*B65G 1/08*  (2006.01)
*B65H 19/30*  (2006.01)
(Continued)

(52) U.S. Cl.
CPC ................. *B65G 1/08* (2013.01); *B65G 1/12* (2013.01); *B65G 47/5127* (2013.01); *B65H 19/305* (2013.01); *B65G 1/127* (2013.01); *B65G 2201/0217* (2013.01); *B65G 2201/0232* (2013.01); *B65G 2201/0276* (2013.01); *B65H 2301/41812* (2013.01); *B65H 2301/41816* (2013.01); *B65H 2553/00* (2013.01); *B65H 2701/1924* (2013.01)

(58) Field of Classification Search
CPC ....................................................... B65G 1/08
See application file for complete search history.

(56) References Cited

U.S. PATENT DOCUMENTS 3,674,159 A * 7/1972 Lemelson ............ B65G 1/0407
414/276
3,753,507 A * 8/1973 James ...................... B65G 1/08
414/276
(Continued)

FOREIGN PATENT DOCUMENTS

WO    2004041689 A1    5/2004
WO    2011089634 A1    7/2011

*Primary Examiner* — Jonathan Snelting
(74) *Attorney, Agent, or Firm* — Innovation Capital Law Group, LLP; Vic Lin

(57) ABSTRACT

A buffer (1) for paper cores comprises: a structure (2); a plurality of planes (5), arranged one over the other for accumulating cores; a mechanism (6) for feeding the cores associated with the planes (5) to provide the cores being fed; a first device (11) for transferring cores by the mechanism (6) to one of the planes (5), the first device (11) being interposed between the mechanism (6) and the planes (5) and being movable from one plane (5) to another in order to transfer the cores to the latter; a mechanism (16) associated with the planes (5) in order to discharge the accumulated cores; a second transferring device (21), interposed between the planes (5) and the mechanism (16), for transferring cores from the planes (5) to the mechanism (16), the second device (21) being movable from one plane (5) to another in order to empty the planes (5).

13 Claims, 6 Drawing Sheets

(51) Int. Cl.
   *B65G 47/51* (2006.01)
   *B65G 1/12* (2006.01)
   *B65G 1/127* (2006.01)

(56) References Cited

U.S. PATENT DOCUMENTS

| | | | | |
|---|---|---|---|---|
| 4,872,543 A * | 10/1989 | Hinchcliffe | ............... | A24C 5/35 198/347.3 |
| 5,833,045 A * | 11/1998 | Osti | ................ | A24C 5/35 198/444 |
| 6,283,324 B1 * | 9/2001 | Jenkins | ................ | B65G 1/08 221/192 |
| 9,221,607 B2 * | 12/2015 | Marti | ................ | B29D 30/0016 |
| 9,908,700 B2 * | 3/2018 | Perini | ................ | B65G 47/5104 |
| 2006/0163031 A1 * | 7/2006 | Perini | ................ | B65G 47/5181 198/347.1 |
| 2017/0073160 A1 | 3/2017 | Perini | | |

\* cited by examiner

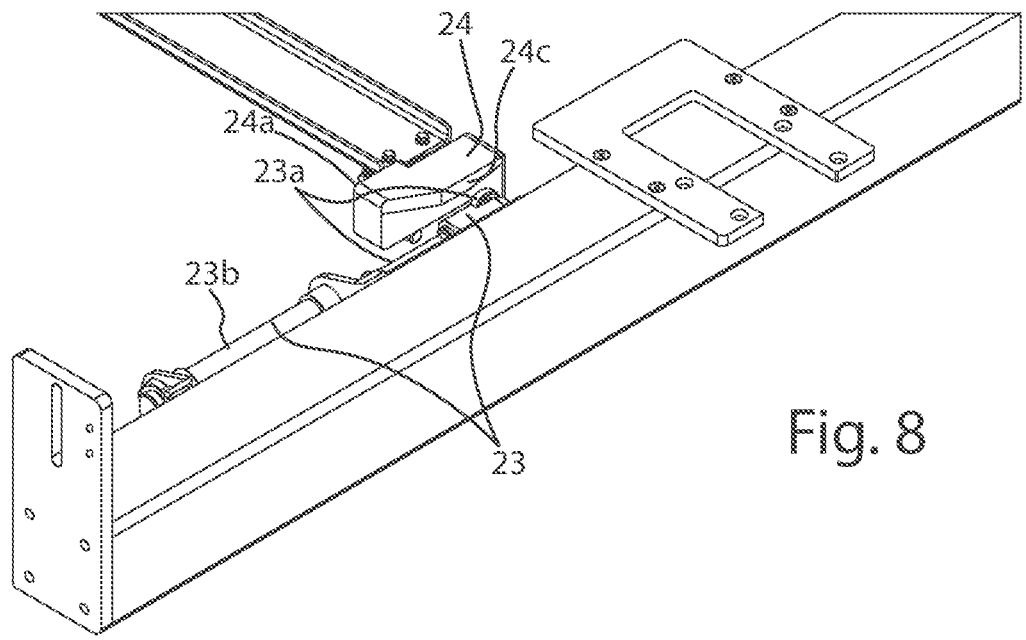
Fig. 8
Fig. 9
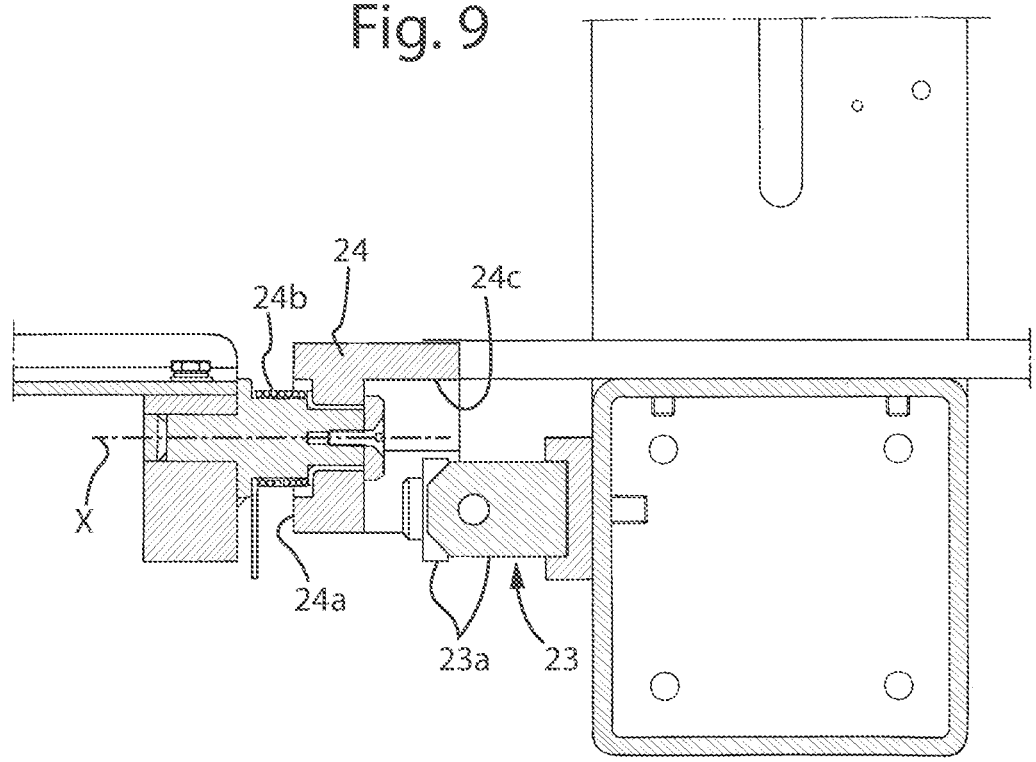

BUFFER APPARATUS FOR CORES MADE OF PAPER MATERIAL, FOR PRODUCTION LINES OF TOILET ROLLS OR ABSORBENT PAPER ROLLS OR SIMILAR PAPER OR ABSORBENT MATERIALS

BRIEF SUMMARY OF THE INVENTION

The present invention relates to a buffer apparatus for cores made of paper material, for production lines of toilet rolls or absorbent paper rolls or similar paper or absorbent materials.

The object of the present invention is particularly used in the industrial field of machines and devices intended to make paper rolls or "logs", such as for example toilet paper, absorbent paper and/or similar paper or absorbent materials.

As is known, in the production lines of toilet rolls, absorbent paper or similar paper or absorbent materials, there are generally provided one or more recoilers intended to wind the layers of paper or absorbent material, coming from respective feeding stations, onto respective cores, they also being made of paper material, preferably cardboard or paperboard coming from respective supply chains and fed to the recoilers by means of corresponding feeding lines.

Normally, the cores are collected inside respective storage cases which are arranged along the feeding lines of the recoilers upstream of the latter.

Each storage case generally consists of a box-like body that delimits a broad collection volume for accumulating cores being fed.

The collection volume of each storage case is open at the top so as to allow the filling by gravity thereof.

In detail, the cores being fed are conducted towards the upper opening of the collection volume and caused to fall inside it so as to rest on top of one another starting from the bottom of the storage case.

The cores accumulated inside the collection volume of each storage case are picked from the bottom of it by means of a respective discharge mechanism which transfers them onto a feed conveyor of a respective recoiler.

Although the known buffer apparatuses of the cores allow a fairly good management of the feeding of the production lines of the toilet rolls, absorbent paper or similar paper or absorbent materials, the Applicant has encountered that they are not free from certain drawbacks and they may be improved in terms of certain aspects, mainly in relation to the structural integrity of the cores to be fed to the recoilers, to the handling thereof during the feed path from the respective storage cases to the corresponding recoilers, to the handling of the cores by the components of the recoilers during the winding of the layers of paper or absorbent material, and also to the final quality of the rolls obtained.

In particular, the Applicant has encountered that the vertical stacking of the cores inside the collection volume of each storage case causes the crushing and ovalization of cores arranged close to the bottom of the storage case, that is to say of the cores ready to be picked by the discharge mechanism and fed to the relative recoilers.

The problem of the structural yielding of the cores arranged on the bottom of the storage cases is worsened when the cores being fed have a spiral-wound monolayer structure. This type of structure is not very resistant and yields easily under the weight of the overlying cores.

The crushing and ovalization of the cores being fed make handling and moving them difficult. In fact, during the advancement path towards the recoilers or at the latter, the crushed and ovalized cores tend to take anomalous positions that inevitably block the cores being fed from moving forward or cause malfunctioning of the respective recoilers.

This involves the undesired stopping of the feed process and/or of the operation of the respective recoilers in order to allow the removal of the anomaly.

It is also worth noting that the crushing and the ovalization of the cores being fed significantly invalidate the quality of the rolls produced, which are to be discarded with significant losses in terms of time and production costs.

The main object of the present invention is to propose a buffer apparatus for cores for production lines of toilet rolls or absorbent paper rolls or similar paper or absorbent materials, capable of resolving the problems encountered in the known technique.

It is an object of the present invention to protect the structural integrity of the cores collected inside accumulation cases and being fed to the respective recoilers.

It is a further object of the present invention to avoid handling problems of the cores along any feeding path towards the recoilers.

It is also an object of the present invention to avoid handling problems of the cores by the components of the recoilers during the winding operations of the layers made of paper or absorbent material.

It is also an object of the present invention to completely eliminate or minimize the causes of the frequent scraps of paper rolls produced.

The above specified objects and others again are substantially achieved by a buffer apparatus for cores for production lines of toilet rolls or absorbent paper rolls or similar paper or absorbent materials, as stated and described in the following claims.

There is now provided, by way of example, the description of a preferred, but not exclusive, embodiment of a buffer apparatus for cores for production lines of toilet rolls or absorbent paper rolls or similar paper or absorbent materials, according to the present invention.

BRIEF DESCRIPTION OF THE DRAWINGS

The description will be made herein below with reference to the accompanying drawings, provided for indicative purposes only and therefore not limiting, wherein:

FIG. 8 is a further perspective view of the detail of FIG. 7;

FIG. 9 is a further schematic view of the detail of FIGS. 7 and 8.

DETAILED DESCRIPTION OF THE PREFERRED EMBODIMENTS

Figure 1:
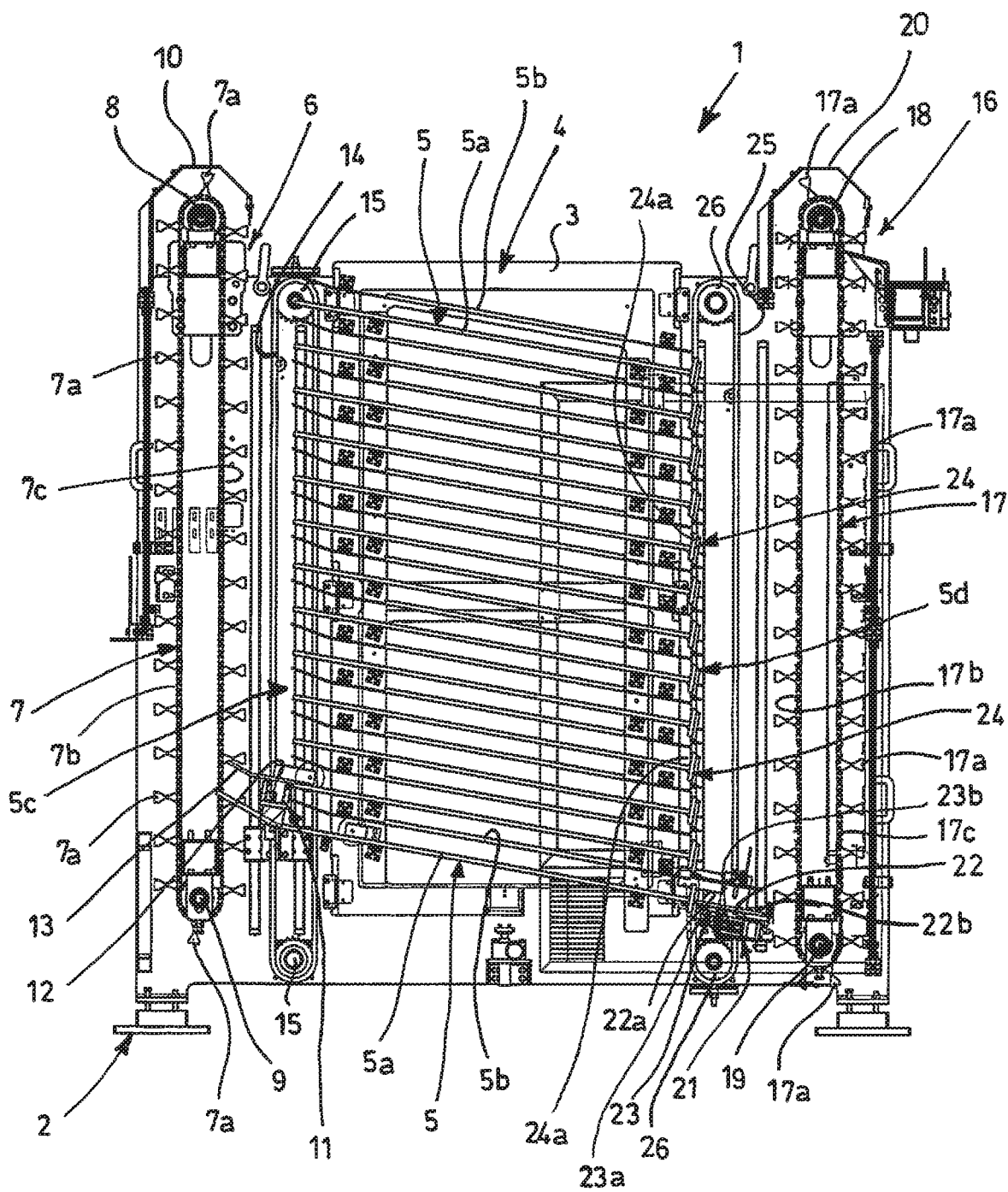
FIG. 1 is an elevated schematic view of a buffer apparatus for cores for production lines of toilet rolls or absorbent paper rolls or similar paper or absorbent materials, according to the present invention.

With reference to the diagram shown in FIG. 1, numeral 1 indicates as a whole, a buffer apparatus for cores for production lines of toilet rolls or absorbent paper rolls or similar paper or absorbent materials according to the present invention.

As shown in FIG. 1, the buffer apparatus 1 comprises a support structure 2, preferably a case 3 which delimits a housing compartment 4 suitable for housing therein the components of the buffer apparatus itself.

Again with reference to the diagram of FIG. 1, the buffer apparatus 1 comprises a plurality of inclined accumulation planes 5, arranged one over the other, defining a vertical store arranged for the accumulation of paper material cores, in particular in the shape of logs, for making toilet rolls or absorbent paper rolls or similar paper or absorbent materials.

The inclined accumulation planes 5 lie inside the housing compartment 4 of the respective case 3 in a substantially central position.

Each inclined accumulation plane 5 is defined by two or more support rods 5a that develop parallel to each other to provide different support points to the cores being accumulated.

Each inclined accumulation plane 5 is also provided with at least one upper containment element 5b, preferably one for each of the support rods 5a of the inclined accumulation plane 5, which mainly develops substantially parallel to the respective support rod 5a.

Again with reference to the diagram of FIG. 1, each inclined accumulation plane 5 has an inlet front 5c intended to receive the cores being fed and an outlet front 5d, arranged on the opposite side with respect to the inlet front 5c and from which the accumulated cores are discharged.

Advantageously, each upper containment element 5b is oriented at the inlet front 5c of each inclined accumulation plane 5 so as to move away from the respective support rod 5a to facilitate the entry of the cores being fed into the respective inclined accumulation plane 5.

The buffer apparatus 1 also comprises at least one mechanism 6 for feeding the cores, operatively associated with the inclined accumulation planes 5 in order to provide to the latter the cores being fed by a specific feeding line (not depicted in the accompanying drawings) not belonging to the buffer apparatus 1.

The feeding mechanism 6 also at least partially lies inside the housing compartment 4 of the case 3, beside the inclined accumulation planes 5.

In detail, the feeding mechanism 6 comprises at least one feeding chain 7, preferably two or more, substantially arranged parallel to one another, at the inlet front 5c of the accumulation planes 5.

Each feeding chain 7 of the feeding mechanism 6 is provided with a plurality of support elements 7a, each arranged to support a respective core to be fed to the inclined accumulation planes 5.

In even greater detail, each feeding chain 7 of the feeding mechanism 6 develops substantially vertically about an upper gear 8 and a lower gear 9, thus defining an ascending branch 7b which faces outwards on the opposite side of the inlet front 5c of the accumulation planes 5, and a descending branch 7c facing the inlet front 5b of the accumulation planes 5.

Advantageously, the buffer apparatus 1 is provided, at the upper gear 8 of each feeding chain 7, with a respective containment sheet 10 that substantially develops following the development of the relative feeding chain 7 on the upper gear 8.

During the operation of the buffer apparatus 1, the cores arriving from the respective feeding line are transferred onto the support elements 7a of the feeding chain 7 so as to be transported towards the inlet front 5c of the accumulation planes 5. Each core is then transported from a respective support element 7a along the ascending branch 7b of the feeding chain 7 up to reaching the upper gear 8. When each core reaches the upper gear 8 of each feeding chain 7, it follows a curvilinear length of path that is bordered by the respective containment sheet 10. During such curvilinear length of path, each core disengages from the respective support element 7a to fall onto the successive support element 7a of the descending branch 7c. Each core then continues its descent along the descending branch 7c of the feeding chain 7 up to reaching the respective inclined accumulation plane 5 at which it is transferred onto the latter, thus freeing the respective support element 7a that moves forward to get over the lower gear 9 and travel the ascending branch 7b of the feeding chain 7 again up to receiving a new core to be transported.

Figure 2:
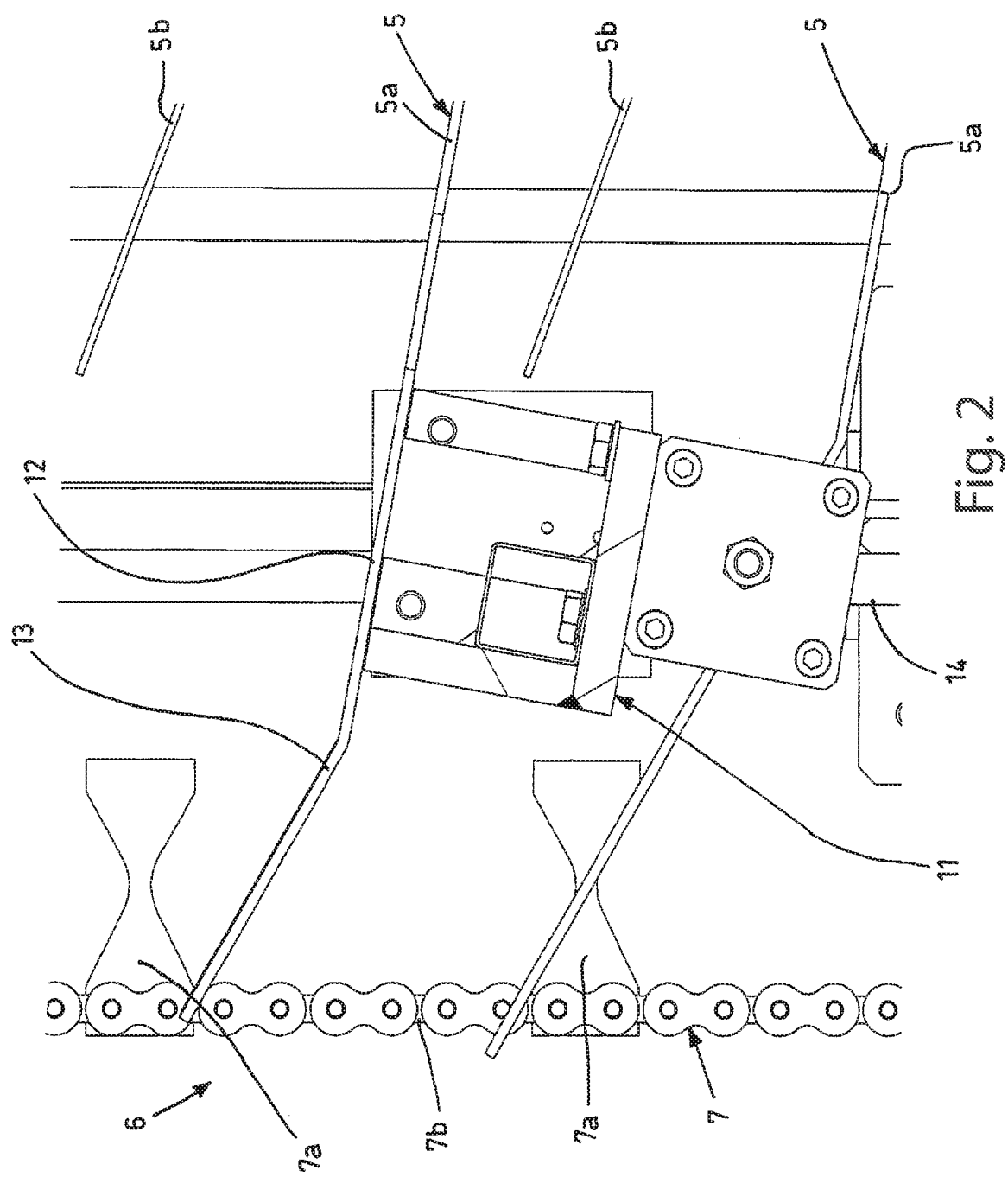
FIG. 2 is an enlargement of a detail of FIG. 1.

The buffer apparatus 1 also comprises a first device 11 (FIG. 2) for transferring cores being fed by the feeding mechanism 6 to at least one of the inclined accumulation planes 5.

As shown in the diagram of FIG. 1, the first transferring device 11 is operatively interposed between the feeding mechanism 6 and the inclined accumulation planes 5, inside the housing compartment 4 of the case 3, and is movable, preferably consecutively, from one inclined accumulation plane 5 to another selected inclined accumulation plane 5 in order to transfer the cores being fed onto the latter.

In particular, the first transferring device 11 comprises a conveying plane 12 operatively interposed between the descending branch 7c of the feeding chain 7 of the feeding mechanism 6 and the inlet front 5c of the inclined accumulation planes 5 in order to drive one or more cores transported by the feeding mechanism 6 to at least one selected inclined accumulation plane 5.

Preferably, the conveying plane 12 of the first transferring device 11 lies on an inclined plane at least partly having the same slope as the inclined accumulation planes 5.

The conveying plane 12 of the first transferring device 11 comprises at least one intercepting portion 13 adapted to intercept one or more cores transported by the feeding mechanism 6 to direct the cores towards the respective selected inclined accumulation plane 5.

Advantageously, the intercepting portion 13 of the conveying plane 12 of the first transferring device 11 has a slope which is greater than the slope of the conveying plane itself, so as to facilitate the travel, by gravity, of each intercepted core towards the respective selected inclined accumulation plane 5.

Each support element 7a of the feeding chain 7 of the feeding mechanism 6 is further configured and shaped so as to allow the intercepting portion 13 of the conveying plane 12 to directly interact with the transported cores without interfering with the support elements 7a when the feeding chain itself moves forward.

Thereby, the relative motion between the feeding chain 7 of the feeding mechanism 6 and the conveying plane 12 of the first transferring device 11 causes each core, transported by a respective support element 7a of the feeding chain 7, to rest on the intercepting portion 13 of the conveying plane 12 of the first transferring device 11 and the consequent descent of such core towards the respective selected inclined accumulation plane 5.

Advantageously, the intercepting portion 13 of the conveying plane 12 of the first transferring device 11 is movable between a non-operating position, in which it is not able to intercept any core transported by the feeding chain 7 of the feeding mechanism 6, and an operating position, in which it is able to intercept the cores transported by the feeding chain 7 of the feeding mechanism 6 in order to direct the cores towards the selected inclined accumulation plane 5.

When the intercepting portion 13 of the conveying plane 12 of the first transferring device 11 is in the non-operating position, the first transferring device 11 may move from one inclined accumulation plane 5 to another inclined accumulation plane 5 in a direction opposite to the descent of the support elements 7a of the feeding chain 7, along the descending branch 7c of the latter.

The movement of the first transferring device 11 is made possible by respective belt movement mechanisms 14 and by respective gears 15, at least one of which being motorised.

According to an advantageous aspect of the present invention, the first transferring device 11 is provided with at least one unit (not illustrated in the attached figures) for detecting the filling of the selected inclined accumulation plane 5.

In detail, the detection unit, which may comprise for example an optical sensor (photoelectric cell, video camera, etc.) or a proximity sensor, is directly mounted on the first transferring device 11 and is configured to detect the presence of the cores of each inclined accumulation plane 5 that are in proximity of the inlet front 5c.

In other words, when an inclined accumulation plane 5 is selected by the first transferring device 11 by the latter being placed at the same level, the detection unit continuously or periodically verifies the filling status of the respective inclined accumulation plane 5. This operation is performed by verifying the presence or absence of cores arranged at or in proximity of the inlet front 5c of the respective inclined accumulation plane 5.

When the detection unit of the first transferring device 11 detects the fixed presence of one or more cores at or in proximity of the inlet front 5c of the selected inclined accumulation plane 5, the first transferring device 11 is moved to align with an inclined accumulation plane 5, generally the successive one descending, which is able to receive the cores being fed because it is empty or partially filled.

Naturally, the selection of the inclined accumulation plane 5 on which to convey the cores may also occur by moving the first transferring device 11 at any inclined accumulation plane 5 that is empty or partially filled.

When the movement of the first transferring device 11 towards the selected inclined accumulation plane 5 requires the descent thereof, the intercepting portion 13 of the respective conveying plane 12 may be kept in the operating position. This is possible because the support elements 7a of the feeding chain 7 that are crossed by the descending intercepting portion 13 are not occupied by any core, therefore there being no interference between transported cores and moving intercepting portion 13.

Contrarily, when the movement of the first transferring device 11 towards the selected inclined accumulation plane 5 instead requires the lifting thereof, the intercepting portion 13 of the respective conveying plane 12 must be moved into the non-operating position to avoid removing the cores resting on the respective support elements 7a of the feeding chain 7 which are crossed by the conveying plane 12.

According to an advantageous aspect of the present invention, it is preferable for the first transferring device 11 to select a further inclined accumulation plane 5 on which to direct the cores transported by the feeding mechanism 6 after the detection unit has detected the filling of the reference inclined accumulation plane 5.

As shown in FIG. 1, the buffer apparatus 1 also comprises a discharge mechanism 16 operatively associated with the inclined accumulation planes 5 at the outlet front 5d of the latter in order to discharge the cores accumulated therein.

The discharge mechanism 16 also at least partially lies inside the housing compartment 4 of the case 3, beside the inclined accumulation planes 5 on the side opposite to the feeding mechanism 6.

The discharge mechanism 16 comprises at least one discharge chain 17, preferably two or more, substantially arranged parallel to one another, at the outlet front 5d of the accumulation planes 5.

Each discharge chain 17 is provided with a plurality of support elements 17a each arranged to support a respective core to be transported towards a respective feed conveyor (not shown in the attached figures) of at least one recoiler (it also not shown).

Each discharge chain 17 of the discharge mechanism 16 develops substantially vertically about an upper gear 18 and a lower gear 19, thus defining an ascending branch 17b which faces the outlet front 5d of the accumulation planes 5, and a descending branch 17c facing away from such outlet front 5d, towards the outside of the case 3 of the support structure 2.

Advantageously, the buffer apparatus 1 is provided, at the upper gear 18 of each discharge chain 17, with a respective containment sheet 20 that substantially develops following the development of the relative discharge chain 17 on the upper gear 18.

During the operation of the buffer apparatus 1, the cores that are discharged from the accumulation planes 5 are transferred onto the support elements 17a of each discharge chain 17 to be transported towards the feed conveyor of the respective recoiler. The cores are then transported by the respective support elements 17a along the respective ascending branch 17b of the respective discharge chain 17 up to reaching the respective upper gear 18. When the cores reach the upper gear 18 of each discharge chain 17, they follow a curvilinear length of path that is bordered by a respective containment sheet 20. During such curvilinear length of path, each core disengages from the respective support element 17a to fall onto the successive support element 17a of the respective descending branch 17c. Each core then continues its descent along the respective descending branch 17c of the respective discharge chain 17 up to being transferred, in known manner, onto a respective feed conveyor (not shown) of a respective recoiler (not illustrated), thus freeing the respective support element 17a that moves forward to get over the respective lower gear 19 and travel the respective ascending branch 17b of the respective discharge chain 17 again up to receiving a new core from a respective inclined accumulation plane 5.

Advantageously, the buffer apparatus 1 comprises a second device 21 (FIG. 3) for transferring the cores present in at least one of the inclined accumulation planes 5 to the discharge mechanism 16.

As shown in the diagram of FIG. 1, the second transferring device 21 is operatively interposed inside the housing compartment 4 of the case 3, between the outlet front 5d of the inclined accumulation planes 5 and the ascending branch 17b of the discharge chain 17 of the discharge mechanism 16.

The second transferring device 21 is movable from one inclined accumulation plane 5 to another selected inclined accumulation plane 5 in order to transfer the accumulated cores to the discharge mechanism 16.

In greater detail, the second transferring device 21 comprises a discharge plane 22 operatively interposed between the discharge chain 17 of the discharge mechanism 16 and the inclined accumulation planes 5 in order to direct one or more cores accumulated in a specific inclined accumulation plane 5 to the discharge mechanism 16.

According to an advantageous aspect of the present invention, the discharge plane 22 of the second transferring device 21 is movable, preferably consecutively descending, from one inclined accumulation plane 5 to another successive inclined accumulation plane 5. As shown in the diagrams depicted in FIGS. 1 and 3, the discharge plane 22 of the second transferring device 21 lies on an inclined plane at least partly having the same slope as the inclined accumulation planes 5 so as to convey the cores of each selected inclined accumulation plane 5, in particular by gravity, towards the discharge chain 17 of the discharge mechanism 16.

With particular reference to the second transferring device 21, the discharge plane 22 of the latter has a first portion 22a facing the accumulation planes 5 and a second portion 22b facing the discharge mechanism 16.

Advantageously, the discharge plane 22 of the second transferring device 21 is provided with a control device 23 (diagrammatically depicted in figures from 3 to 5 and from 7 to 9), which is operatively arranged at the first portion 22a. The control device 23 is arranged to interact with a respective stop element 24 (FIGS. 1 and 3 to 9) operatively placed on each of the accumulation planes 5 at the outlet front 5d of the latter.

The interaction between the control device 23 and the respective stop element 24 of the selected inclined accumulation plane 5 allows the passage of the cores accumulated therein to the discharge plane 22 of the second transferring device 21.

In detail, the stop element 24 of each inclined accumulation plane 5 is movable between an operating position (FIG. 1 and from 3 to 9), in which it provides a rest plane 24a for the cores accumulated therein, and a non-operating position (not illustrated in the attached figures), in which the rest plane 24a disengages, thus allowing the cores accumulated in the respective inclined accumulation plane 5 to move forward towards the discharge plane 22 of the second transferring device 21 and accordingly, towards the second discharge mechanism 16.

Advantageously, the control device 23 comprises at least one mechanism of mechanical or fluid-dynamic or electrical type that can be activated to switch the stop element 24 of each selected inclined accumulation plane 5 at least from the operating position to the non-operating position.

Preferably, each stop element 24 is provided with an automatic return mechanism (figures from 4 to 9), such as for example a spring 24b, arranged to switch the latter from the non-operating position to the operating position when the control device 23 no longer interacts with the respective stop element 24.

Figure 3:
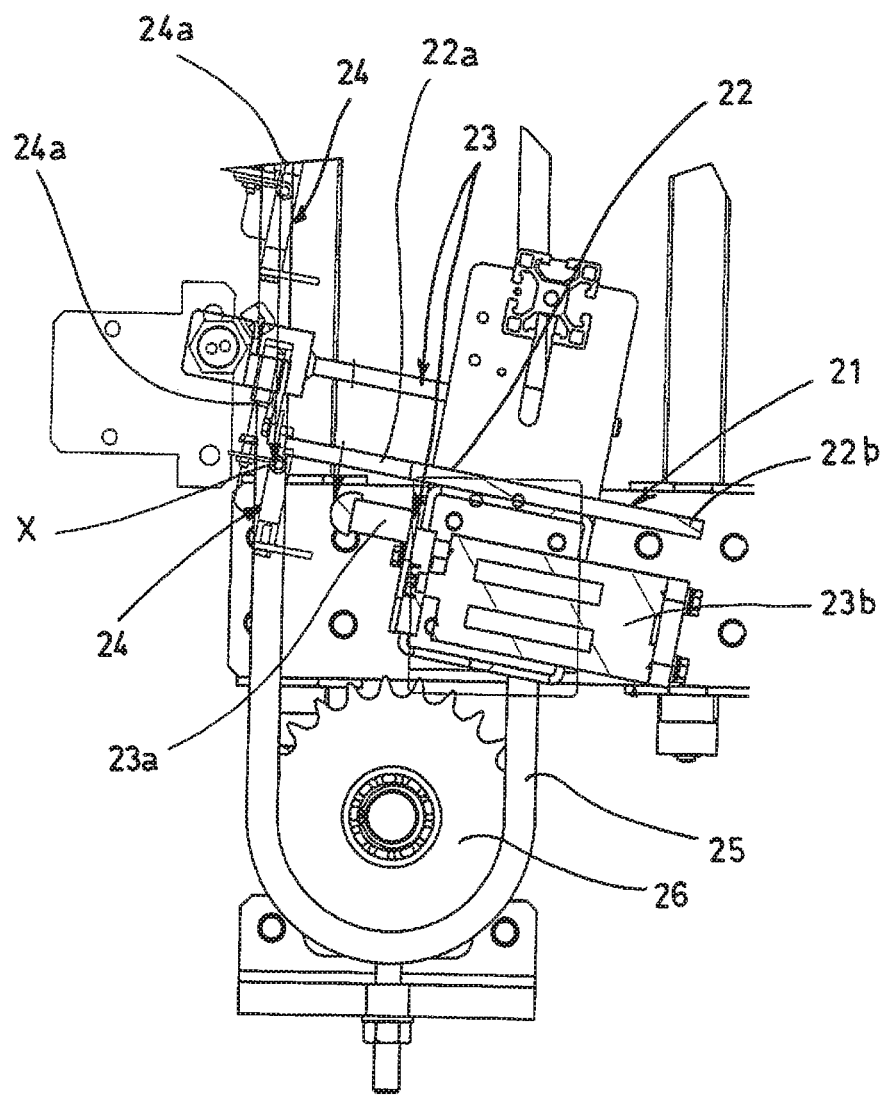
FIG. 3 is a further enlargement of a detail of FIG. 1.

As shown in the embodiments illustrated in FIGS. 1 and 3, the control device 23 preferably provides at least one pusher element 23a connected to a fluid-dynamic cylinder 23b to move the rest plane 24a of the respective stop element 24 from the operating position to the non-operating position. In such solution, the pusher substantially moves parallel to the main development of the respective inclined accumulation plane 5 so as to act on the respective stop element 24. The latter, being hinged to the respective inclined accumulation plane 5, rotates from the operating position to the non-operating position about an axis "X" (FIG. 3) substantially perpendicular to the main development of the respective inclined accumulation plane.

Figure 4:
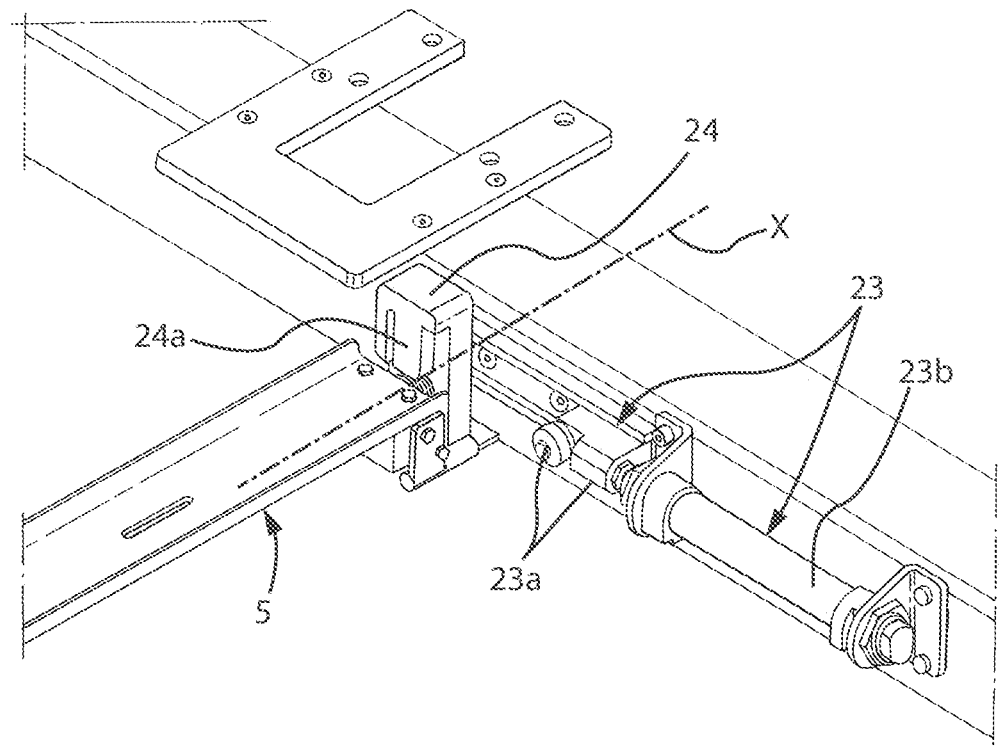
FIG. 4 is an enlarged perspective view of a further embodiment of a detail of the buffer apparatus for cores of FIG. 1, depicted in an operating condition.
Figure 5:
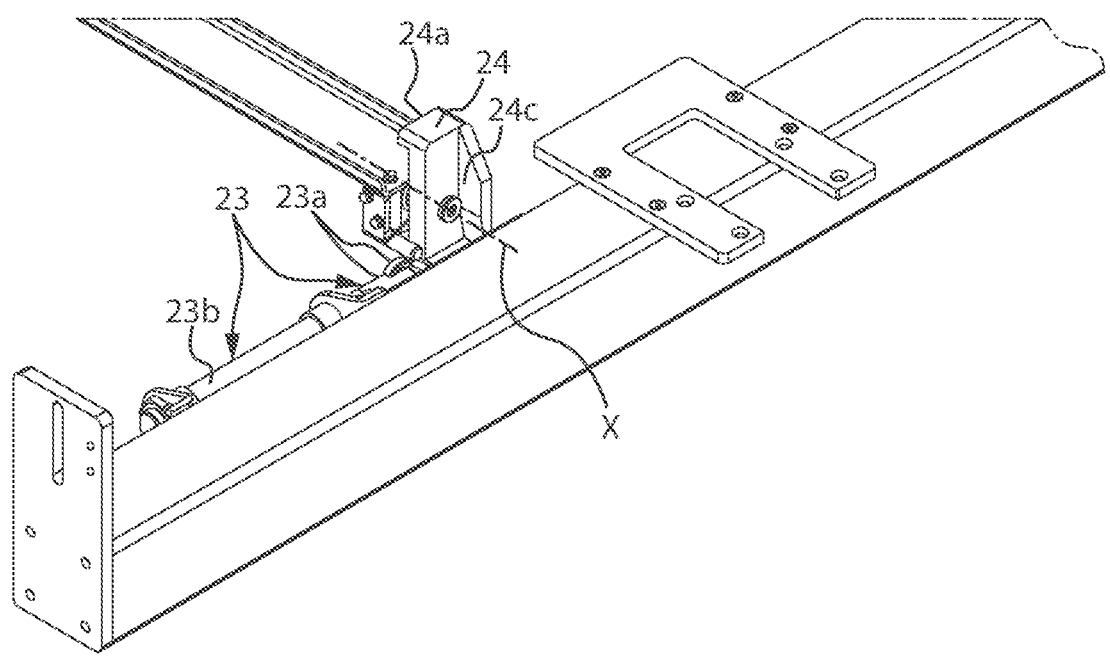
FIG. 5 is a further perspective view of the detail of FIG. 4.
Figure 6:
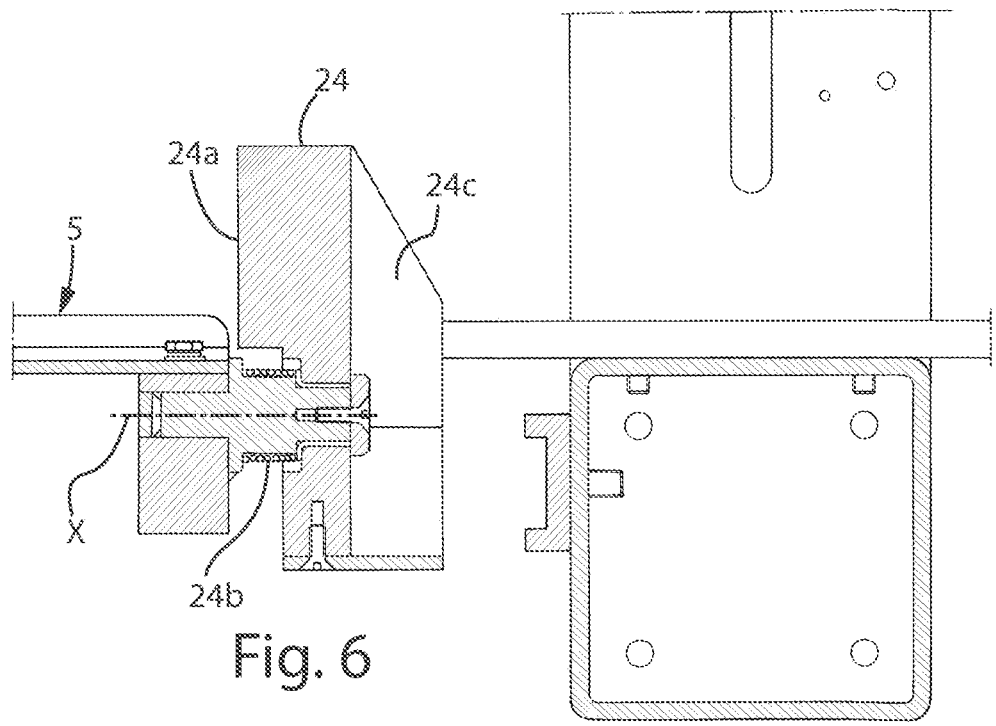
FIG. 6 is a further schematic view of the detail of FIGS. 4 and 5.
Figure 7:
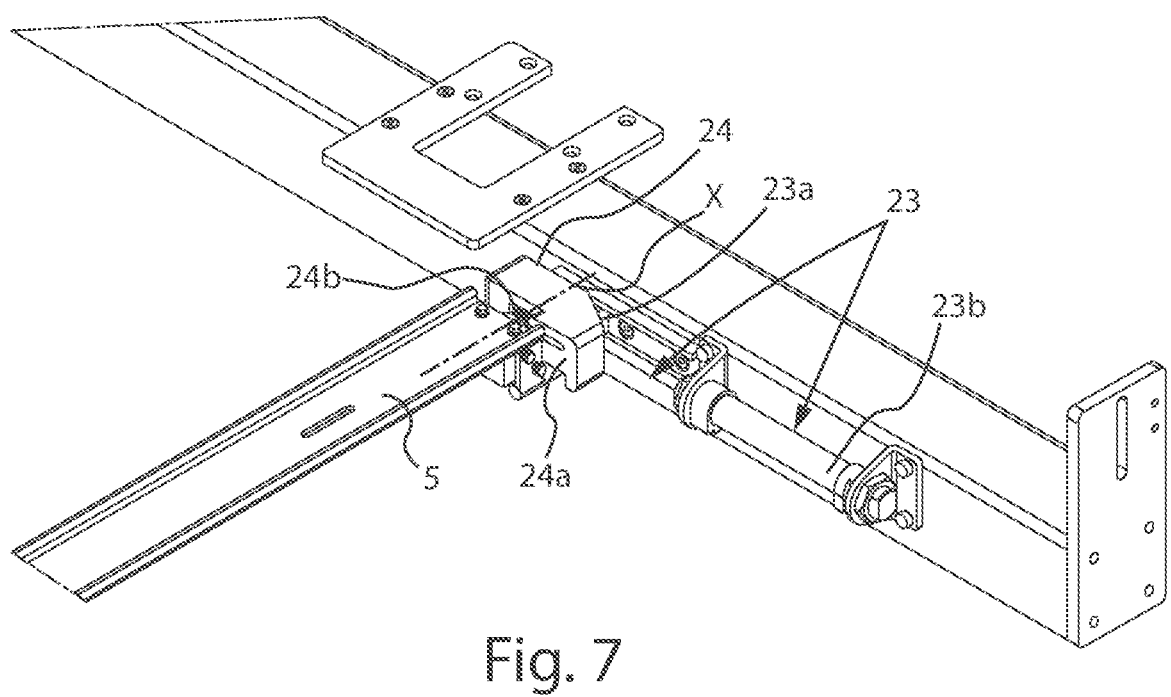
FIG. 7 is a perspective view of the detail of figures from 4 to 6, depicted in a non-operating condition.

According to the embodiment shown in FIGS. 4, 5 and from 7 to 9, the stop element 24 of each inclined accumulation plane 5 is hinged to the latter so as to rotate between the operating condition (figures from 3 to 6) and the non-operating condition (figures from 7 to 9) about an axis "X" substantially parallel to the main development of the respective inclined accumulation plane 5. In this situation, the control device 23 provides a pusher element 23a connected to a fluid-dynamic cylinder 23b. The pusher element 23a is capable of moving substantially perpendicularly to the main development of each inclined accumulation plane 5 to intercept an abutment shoulder 24c of the respective stop element 24 in order to rotate the latter about the axis "X" from the operating condition to the non-operating condition.

According to an advantageous aspect of the present invention, the second transferring device 21 is provided with at least one unit (not illustrated in the attached figures) for detecting the emptying of the selected inclined accumulation plane 5.

In detail, the detection unit, which may comprise for example an optical sensor (photoelectric cell, video camera, etc.) or a proximity sensor, may be directly mounted on the first portion 22a of the discharge plane 22 of the second transferring device 21 and is configured to detect the presence of the cores of each inclined accumulation plane 5 that are in proximity of the outlet front 5c.

In other words, when an inclined accumulation plane 5 is selected by the second transferring device 21 by the latter being placed at the same level and allowing the cores to move forward towards the discharge mechanism 6, the detection unit continuously or periodically verifies the emptying status of the respective inclined accumulation plane 5. This operation is performed by verifying the presence or absence of cores arranged at or in proximity of the outlet front 5d of the respective inclined accumulation plane 5.

When the detection unit of the second transferring device 21 detects the absence of cores at or in proximity of the outlet front 5d of the selected inclined accumulation plane 5, the second transferring device 21 is moved to align with an inclined accumulation plane 5, generally the successive one descending, which is full or partially filled.

The movement of the second transferring device 16 is made possible by respective belt movement mechanisms 25 and by respective gears 26, at least one of which being motorised.

During the operation of the buffer apparatus 1, the stop element 24 of each inclined accumulation plane 5 is kept in operating position up to when the control device 23 of the second transferring device 21 switches it into the non-operating position. Such switching is performed when the discharge plane 22 is placed at the same level as a selected inclined accumulation plane 5, thus allowing the control device 23 to interact with the respective stop element 24. In this situation, the cores on the respective inclined accumulation plane 5 are free to move forward towards the discharge mechanism 16, each occupying a support element 17a.

The buffer apparatus resolves the problems encountered in the art, thus ensuring significant advantages.

Firstly, the presence of the inclined accumulation planes allows the storage of the cores, thus avoiding them from weighing on one another. Therefore, accumulation planes protect the structural integrity of the cores, thus avoiding them from being crushed and ovalized.

Since the buffer apparatus 1 thus conceived ensures keeping the shape of the cores being fed, the handling problems of such cores during the feeding thereof towards the recoilers and by components of the latter, no longer exist.

Accordingly, the stops of the feeding and production lines, normally due to anomalous positions taken on by the crushed and ovalized cores, are significantly reduced or even completely eliminated.

It is also worth noting that the elimination of the crushing and of the ovalization of the cores significantly reduces the number of scraps of the rolls produced because it ensures the final quality thereof. On one hand, this results in significant advantages in terms of time to dedicate to the quality controls, on the other, a significant reduction of the wastes, which results in an economic advantage.

The invention claimed is:

1. A buffer apparatus for cores made of paper material, for production lines of toilet rolls or absorbent paper rolls or similar paper or absorbent materials, the buffer apparatus comprising:
   a support structure;
   a plurality of inclined accumulation planes, arranged one over the other, dedicated to an accumulation of cores, in the shape of logs, for toilet rolls or absorbent paper rolls or similar paper or absorbent materials;
   a mechanism for feeding the cores, operatively associated with the inclined accumulation planes in order to provide the inclined accumulation planes with the cores being fed by a feeding line not belonging to the buffer apparatus;
   a first transferring device for transferring cores fed by the feeding mechanism to at least one of the inclined accumulation planes, the first transferring device being operatively interposed between the feeding mechanism and the inclined accumulation planes and being movable, independent of any movement of the mechanism for feeding the cores, among each of the plurality of inclined accumulation planes in order to transfer the cores being fed to the respective inclined accumulation plane, the first transferring device providing a path between the mechanism for feeding the cores and one of the plurality of inclined accumulation planes;
   a discharge mechanism operatively associated with the inclined accumulation planes in order to discharge the accumulated cores from the respective inclined accumulation plane; and
   a second transferring device for transferring cores that are present in at least one of the inclined accumulation planes to the discharge mechanism, the second transferring device being operatively interposed between the inclined accumulation planes and the discharge mechanism and being movable from an inclined accumulation plane to another inclined accumulation plane in order to transfer the accumulated cores to the discharge mechanism.

2. The buffer apparatus according to claim 1, wherein the first transferring device comprises a conveying plane operatively interposed between a feeding chain of the feeding mechanism and the inclined accumulation planes in order to drive one or more cores transported by the feeding mechanism to at least one inclined accumulation plane, the conveying plane of the first transferring device being movable, consecutively, from an inclined accumulation plane to another selected inclined accumulation plane.

3. The buffer apparatus according to claim 2, wherein the conveying plane of the first transferring device comprises at least one intercepting portion adapted to intercept one or more cores transported by the feeding mechanism and to direct the cores towards the respective selected inclined accumulation plane.

4. The buffer apparatus according to claim 3, wherein the conveying plane of the first transferring device lies on an inclined plane having, at least partially, the same slope as the inclined accumulation planes, the intercepting portion of the conveying plane of the first transferring device having a slope that is greater than the slope of the conveying plane itself, so as to facilitate the travel, by gravity, of each intercepted core towards the respective selected inclined accumulation plane.

5. The buffer apparatus according to claim 3, wherein the intercepting portion of the conveying plane of the first transferring device is movable between a non-operating position, in which it is not able to intercept any core transported by the feeding chain of the feeding mechanism, and an operating position, in which it is able to intercept the cores transported by the feeding chain of the feeding mechanism in order to direct the cores towards the selected inclined accumulation plane.

6. The buffer apparatus according to claim 3, wherein the feeding chain of the feeding mechanism is provided with a plurality of support elements each arranged to support a respective core to be fed to the inclined accumulation planes, each support element of the feeding chain of the feeding mechanism is further configured and shaped so as to allow, when the feeding chain itself moves forward, the intercepting portion of the conveying plane to directly interact with the transported cores without interfering with the support elements, the relative movement between the feeding chain of the feeding mechanism and the conveying plane of the first transferring device determining that the core arranged on the respective support element of the feeding chain rests on the intercepting portion of the conveying plane of the first transferring device and that such core consequently descends towards the respective selected inclined accumulation plane.

7. The buffer apparatus according to claim 3, wherein the first transferring device is provided with at least one unit for detecting a filling of the selected inclined accumulation plane, the first transferring device selecting a further inclined accumulation plane on which to direct the cores transported by the feeding mechanism after the detecting unit has detected the filling of a reference inclined accumulation plane.

8. The buffer apparatus according to claim 1, wherein the second transferring device comprises a discharge plane operatively interposed between a discharge chain of the discharge mechanism and the inclined accumulation planes in order to direct one or more cores accumulated in a selected inclined accumulation plane to the discharge mechanism, the discharge plane of the second transferring device being movable, consecutively, from an inclined accumulation plane to another selected inclined accumulation plane and the discharge chain of the discharge mechanism being provided with a plurality of support elements for transporting cores coming from the selected inclined accumulation plane.

9. The buffer apparatus according to claim 8, wherein the discharge plane of the second transferring device lies on an inclined plane having, at least partially, the same slope as the inclined accumulation planes so as to convey the cores of the selected inclined accumulation plane, by gravity, towards the discharge chain of the discharge mechanism.

10. The buffer apparatus according to claim 8, wherein the discharge plane of the second transferring device has:
   a first portion facing the accumulation planes;
   a second portion facing the discharge mechanism; and
   a control device operatively arranged at the first portion of the discharge plane of the second transferring device, the control device being arranged to interact with a respective stop element operatively located on each of the accumulation planes at an outlet front of the accumulation planes, an interaction between the control device and the respective stop element allowing the cores accumulated in the respective inclined accumulation plane to pass from the respective inclined accumulation plane to the discharge plane of the second transferring device.

11. The buffer apparatus according to claim 10, wherein the stop element of each inclined accumulation plane is movable between an operating position, in which the stop element it provides a rest plane for the cores accumulated therein whereby the transferring of the cores from the feeding mechanism determines a gradual filling thereof, and a non-operating position, in which the rest plane disengages, thus allowing the cores accumulated in the respective inclined accumulation plane to move forward towards the discharge plane of the second transferring device.

12. The buffer apparatus according to claim 11, wherein the control device comprises at least one mechanical or fluid-dynamic or electrical mechanism that can be activated in order to switch the stop element of each inclined accumulation plane at least from the operating position to the non-operating position, each stop element being provided with an automatic return mechanism arranged to switch the stop element from the non-operating position to the operating position in an absence of an interaction with the control device.

13. The buffer apparatus according to claim 10, wherein the second transferring device is provided with at least one unit for detecting an emptying of the selected inclined accumulation plane, the second transferring device selecting a further inclined accumulation plane to be emptied after the respective detecting unit has detected an absence of cores in a reference inclined accumulation plane.

\* \* \* \* \*